United States Patent
Palma et al.

(10) Patent No.: US 7,627,671 B1
(45) Date of Patent: Dec. 1, 2009

(54) MONITORING AND PERFORMANCE MANAGEMENT OF COMPONENT-BASED APPLICATIONS

(75) Inventors: Derek A. Palma, Union City, CA (US); Darren Marshall Price, Mountain View, CA (US)

(73) Assignee: ClearApp, Inc., Mountain View, CA (US)

( * ) Notice: Subject to any disclaimer, the term of this patent is extended or adjusted under 35 U.S.C. 154(b) by 1037 days.

(21) Appl. No.: 10/851,385

(22) Filed: May 22, 2004

(51) Int. Cl.
*G06F 15/173* (2006.01)

(52) U.S. Cl. .................................... 709/224; 709/223

(58) Field of Classification Search .................. None
See application file for complete search history.

(56) References Cited

U.S. PATENT DOCUMENTS

| | | | | |
|---|---|---|---|---|
| 6,591,272 | B1 * | 7/2003 | Williams | 707/102 |
| 6,792,460 | B2 * | 9/2004 | Oulu et al. | 709/224 |
| 7,003,560 | B1 * | 2/2006 | Mullen et al. | 709/223 |
| 7,099,885 | B2 * | 8/2006 | Hellman et al. | 707/103 R |
| 2002/0059272 | A1 * | 5/2002 | Porter | 707/100 |
| 2002/0116455 | A1 * | 8/2002 | Mitchell et al. | 709/203 |
| 2004/0015408 | A1 * | 1/2004 | Rauen et al. | 705/26 |

* cited by examiner

*Primary Examiner*—John B. Walsh
(74) *Attorney, Agent, or Firm*—Mahamedi Paradice Kreisman LLP; Christopher J. Brokaw (57) ABSTRACT

Invention manages underlying application objects that support implemented business functions. A performance manager accesses and interprets application metadata and execution environment metadata, using a hierarchical entity to model complex relationships between application abstractions, components and resources. The performance manager encodes common behavioral and architecture information in models resulting from analysis of component architecture standards, vendor application servers, development tools and administration tools. The performance manager conducts inter-component dependency and control flow analysis, for example by generating control flow graphs from application metadata and performing byte code analysis without access to application source code. The performance manager collects metrics from standardized and vendor-specific sources, instruments interpreters (such as the Java Virtual Machine), and collects and utilizes resource metrics, code performance metrics, configuration parameters, and transaction, failure and lifecycle events.

21 Claims, 4 Drawing Sheets

MONITORING AND PERFORMANCE MANAGEMENT OF COMPONENT-BASED APPLICATIONS

BACKGROUND

1. Field

Invention relates to system and performance management, and in particular to performance management of standardized component architectures.

2. Related Art

Applications based on standardized component architectures, such as J2EE (Sun Microsystems' Java 2.0 Enterprise Edition) and .Net (Microsoft's .Net platform) enable enterprises to more quickly achieve high levels of application front-end and back-end integration and functional richness. Additionally, a new generation of enterprise software development tools use sophisticated graphical user interfaces to enable developers to work at a level of abstraction where abstract reusable objects are selected, interconnected and configured to realize complex business processes without the need to address the details of the underlying implementation components. Such applications are integrating front-end (portals) and back-end systems (such as DBMSs, mainframes, SAP, etc.) resulting in application servers transitioning from component containers to integration hubs through which mission critical business processes are realized.

However, the existing paradigms of system and performance management are difficult to apply and inefficient for this new generation of highly layered and interconnected component based applications. Where traditional paradigms have relied on a one to one mapping between hardware components and software components, this mapping quickly disappears as applications are deployed on application servers where resources and service components are shared across many applications. Resource metrics like CPU usage, memory usage, and I/O activity can no longer be mapped to specific application functions. Application performance measurement tools used to estimate the user experience can identify problematic application functions, but provide no help in identifying root causes. Approaches using code activity metrics through code instrumentation to provide visibility into component performance require detailed application architecture and source code knowledge in order to achieve a useful mapping between the executing code and the business functions realized by the code, and are only feasible for diagnostics of the most severe problems.

A primary impediment for existing system and performance management tools is their inability to "understand" the application architecture, the business functions implemented by the architecture, and the resulting demands on corresponding resources. This is due to the existence of vast amounts of low level technical metrics, a lack of contextual information hierarchies, and ignorance towards available metadata.

Accordingly, there is a need for a performance management approach that addresses the above issues and enables a shift from management based on resource and code activity to a business function oriented management.

SUMMARY

The present invention manages underlying application objects that support implemented business functions. A performance manager accesses and interprets application metadata and execution environment metadata. The performance manager uses a hierarchical entity model to represent complex relationships between application abstractions, components and resources. The performance manager encodes common behavioral and architecture information in models resulting from analysis of component architecture standards, vendor application servers, development tools and administration tools. The performance manager conducts inter-component dependency and control flow analysis, for example by generating control flow graphs from application metadata and performing byte code analysis without access to application source code. The performance manager collects metrics from standardized and vendor-specific sources, instruments code executed by interpreters (such as the Java Virtual Machine), and collects and utilizes resource metrics, code performance metrics, configuration parameters, and transaction, failure and lifecycle events.

DETAILED DESCRIPTION

The following is a glossary of terms as used herein:

Functional abstraction: A functional abstraction represents a mechanism provided by an application framework to represent role and execution of complex business logic. Functional abstractions may comprise workflows (which orchestrate execution of one or more sub tasks hierarchically), services (which provide one or more specific results and/or facilities), presentation flows (which control user interaction), or other presentation, service or data integration abstractions. A functional abstraction may interact with other functional abstractions in an application in order to achieve a desired functional result. Execution of a functional abstraction may be modeled as a directed graph of nodes, the nodes executing in a pre-defined sequence. The execution of a node may be synchronous (returning the result of execution immediately) or asynchronous (causing the desired execution to begin with the result being returned via some form of notification at a later time). A single node may represent a hierarchy of sub-tasks (child nodes) defined recursively as above. Execution of a functional abstraction is modeled by treating the execution as an "instance" of functional abstraction definition. Execution begins at an entry node and terminates at a node due to normal logic, errors, exceptions or abortions. The metrics describing the execution of a functional abstraction node comprise node performance counters and node performance events. Node performance events comprise a sequence of events ordered in time of node execution, and comprise the following events for a node:

Start time: The time a node begins execution.

Compute time: The CPU time spent for execution of a node.

Wait time: The time spent waiting for a result to be returned from an agent outside of a node's control but required for the node's execution.

Completion result: A result of execution of a node, comprising one or more of the following: Normal completion (without errors), timeout (the node did not complete execution within a pre-specified time period), exception (a condition occurred which prevented normal completion), abortion (operator or programmed decision to terminate the node's processing and end the lifecycle of the functional abstraction instance). Note that node performance metrics may be aggregated across functional abstraction instances to provide node execution statistics. Such aggregation comprises counting the occurrence of one or more event types at periodic intervals.

Performance metric: A quantity representing a resource consumed during progress through execution of a functional abstraction. Resource examples comprise time (such as CPU execution time), space (such as memory usage), invocations of supporting components, throughput (such as rate of completion of a unit of execution), and availability (such as the fraction of time a service is able to process requests).

Performance event: A state transition during the execution of a modeled entity. Examples of performance events are: starting, ending, timing out, or failing execution (a) of a functional abstraction, (b) of a node in a functional abstraction, (c) of a component implementing a functional abstraction, (d) of code implementing a component in a functional abstraction, or (e) of any other unit of execution relevant to the quantification of performance of a functional abstraction in a system context.

Framework: A framework comprises a set of one or more functional abstractions which can be applied (for example by a user such as a software developer) to create a functional application along with the runtime mechanisms required to realize the abstractions at application execution time. The user specifies the business logic using functional abstractions. The framework generates appropriate artifacts for enabling an execution of the application, optionally using a framework runtime, the framework runtime providing a set of services to the functional abstraction supported by the framework.

Workflow: One concrete example of a functional abstraction, provided herein for illustrative purposes. A workflow is business oriented such that the work it achieves has some meaning to the business such as automating a tasks or sequence of business process tasks. Workflows provide a generalized model of execution where each node represents a sub task. A single workflow node may represent a hierarchy of sub-tasks (child nodes) defined recursively as above.

Component: A set of code providing a coherent set of one or more functions, optionally leveraging one or more other components.

Functional abstraction performance model (hereinafter also referred to a "model"): A representation of an appropriate set of entities and their relevant interactions within the domain of performance of one or more functional abstractions, wherein the functional abstractions are implemented using one or more frameworks and/or component-based architectures.

Application Server (also referred to as a Managed Server): A server process for executing an application business logic.

Application Server Platform: A set of computing elements (such as servers) interconnected with supporting infrastructure (such as hardware, software, databases, etc.) for deploying and executing component-based applications, such as distributed heterogeneous component-based applications.

Runtime environment: A set of components and services provided for the execution of functional abstractions.

Administrative Server: A server process for the operation, administration and/or management of a set of Managed Servers. An Administrative Server comprises an operations, administration and management (OA&M) API.

The present invention generates a top-down hierarchical model of a component-based application, the application admitting an impractically large number of performance metrics, and then uses the generated model to extract a manageable number of metrics for monitoring and managing the performance of the application. The generated model generally comprises many levels of hierarchy, and the manageable number of extracted metrics are generated to be the ones most helpful for performance monitoring and management. Advantageously, the present approach allows performance monitoring and management using a view of the component-based system at a functional abstraction level, instead of a view of low-level raw metric data.

To accomplish this, metadata describing artifacts created by functional abstraction development tools are first analyzed. From this metadata, a hierarchical model is generated, with the functional abstraction at the highest level of the model. Then the hierarchy is examined top-down, and a set of the most important metrics are selected for monitoring and management. It is an advantageous aspect that first an abstract model of the component-based application is generated using provided functional abstractions, and then the abstract model is mapped to the underlying implementation.

Figure 1:
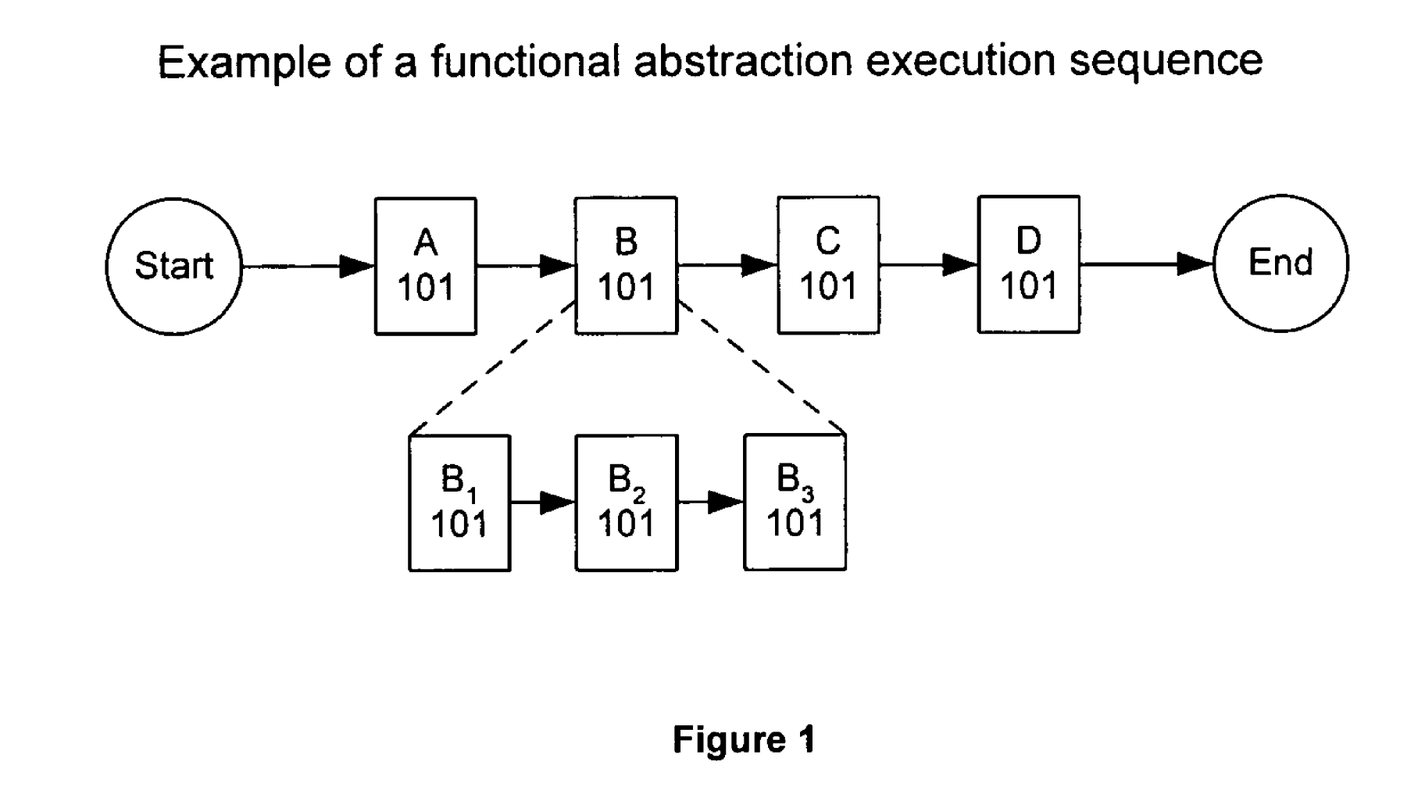
FIG. 1 is a flow diagram illustrating an example of a functional abstraction execution sequence, according to an embodiment of the present invention.

FIG. 1 is a flow diagram illustrating an example of a functional abstraction execution sequence, according to an embodiment of the present invention. Execution nodes 101 A, B, C and D represent the highest level of the hierarchy, while execution nodes 101 B1, B2 and B3 represent the next lower level of hierarchy under execution node 101 B.

Figure 2:
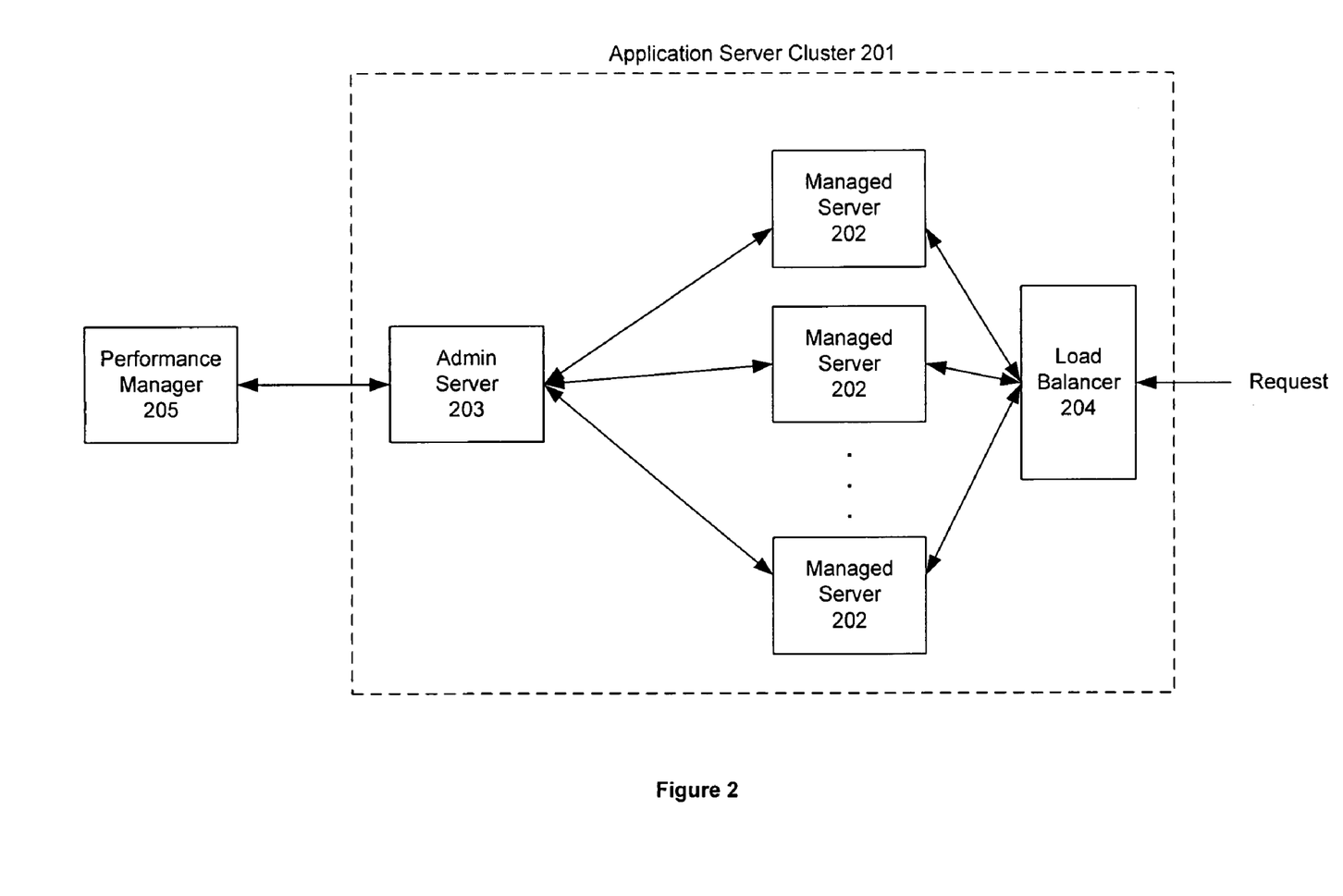
FIG. 2 is a block diagram illustrating a system for monitoring and performance management of component-based applications, according to an embodiment of the present invention.

FIG. 2 is a block diagram illustrating a system for monitoring and performance management of component-based applications, according to an embodiment of the present invention. Application Server Cluster 201 comprises one or more Managed Servers 202 for executing applications and servicing requests. Administrative Server 203 administers Managed Servers 202. Performance manager 205 communicates with Application Server Cluster 201 via Administrative Server 203. Optional Load Balancer 204 distributes requests to Managed Servers 202 according to a load-balancing scheme.

Performance Manager 205 establishes communication with Administrative Server 203 using the OA&M API provided by the Administrative Server 203. Any credentials necessary for initiating and establishing such communication are configured into Performance Manager 205 when it is installed and configured. Upon establishing communication, Performance Manager 205 is able to access information describing the Managed Servers 202 and any additional Administrative Servers available in the Application Server Cluster 201, as well as applications deployed on the Managed Servers 202. Where the set of Managed Servers 202 is not centrally managed by an Admin Server 203, the Managed Servers 202 are identified to the Performance Manager 205 via manual configuration or by probing the Managed Servers 202 over a network in order to determine their attributes (such as configuration of a Managed Server, status of a Managed Server, or other attributes as enumerated above), wherein probing proceeds by searching for supported application server platforms and their supporting infrastructure. Examples of OA&M informational and operational capabilities comprise server configuration, server status, server health and server availability information, operations for altering and/or adding configuration parameters, and/or operations for deploying and un-deploying application components across the Managed Servers 202 (and optionally any Administrative Servers 203) in the Application Server Cluster 201.

In the case that the OA&M API does not have all the capabilities required by the Performance Manger 205 for the target Application Server Cluster 201, an optional custom software agent is written to provide such missing capabilities for the target application server platform. The deployment of such a custom agent is dependent on the target runtime environment in which it operates. Examples of such runtime environments comprise a component container when the target application server is based on a component architecture (such as J2EE, the specification of which can be found at http://java.sun.com/j2ee/j2ee-1 4-fr-spec.pdf and is incorporated herein by reference), or an operating system when the target application server platform is based on a conglomerate of middleware components (such as .Net). In both cases the custom agent is implemented and deployed such that its services are continuously available to the Performance Manager 205.

Performance Manager 205 uses OA&M and/or custom agent services to retrieve application files which constitute applications deployed on the Administrative Server 203 and Managed Servers 202.

Performance manager uses OA&M and/or custom agent services to retrieve information describing the enterprise information systems used by the deployed applications for their proper operation. Examples of such information are connections to external services such as databases, mainframes, TP monitors, message brokers, external third-party services, or other resources or services.

Performance Manager 205 uses OA&M and/or custom agent services to retrieve information describing the services and components provided by the application server platform used by each application. Examples include local and cluster wide messaging services, transactions services, time services, persistence services, or any other such application server platform services, as well as dependencies on framework runtime components (such as containers, dispatchers, schedulers, aggregators, orchestrators, pooling mechanisms, caches, or other such framework runtime components) and interdependencies of application components with other application components.

Performance Manager 205 uses application OA&M APIs to access data stores comprising useful application framework performance runtime information such as event tables and event log files describing functional abstractions, or component execution metrics quantifying the performance of components (when available). Where no specific OA&M API support is available for this purpose, custom code may be added to the Performance Manager 205 (when remote access is possible) or a custom agent created (or augmented) to enable access to the physical information stores (such as log files or database tables) where such information resides.

Performance Manager 205 uses the OA&M API, custom agents as described above and/or agents capable of instrumentation to collect metrics and events which quantify the availability, health, and performance of deployed applications. The decision as to what to collect is a function of the modeling process, described below.

Performance Manager 205 periodically collects metrics (i.e. requests values of metrics via appropriate APIs and/or agents), wherein a practical period comprises for example an interval in the range of 1 to 120 seconds (typically about 15 seconds). Metrics values are stored by Performance Manager 205 in a repository indexed by the semantic roles of the metrics in the model.

Performance Manager 205 uses OA&M APIs and/or agents to receive events asynchronously. Events may be collected as they occur or after they are placed in a data store. Event records are stored by the Performance Manager 205 in a repository indexed by the semantic roles of the events in the model.

Figure 3:
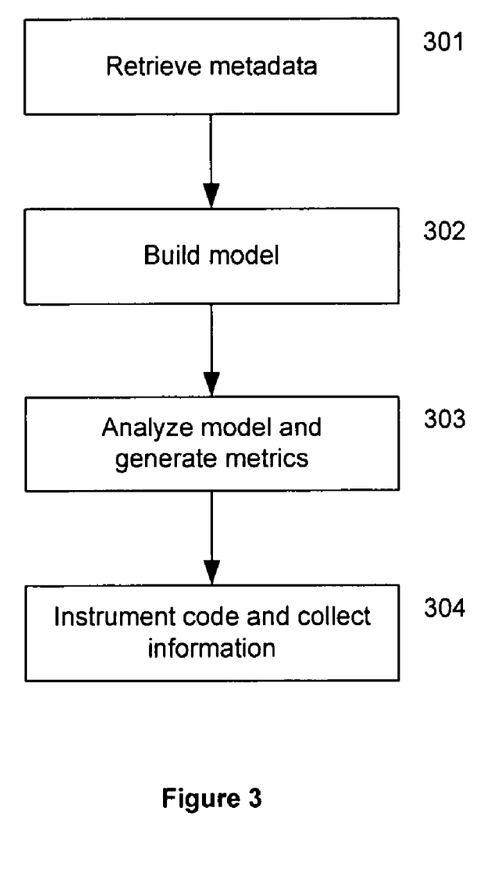
FIG. 3 is a flow diagram illustrating a method for monitoring and performance management of component-based applications, according to an embodiment of the present invention.

FIG. 3 is a flow diagram illustrating a method for monitoring and performance management of component-based applications, according to an embodiment of the present invention. Performance Manager 205 retrieves 301 metadata describing functional abstractions, builds 302 a model for the functional abstractions, analyzes 303 the model and generates metrics, and instruments 304 corresponding code and collects instrumentation results. These steps are described in more detail in the following.

Step 301: Retrieve metadata. The metadata comprises information describing functional abstractions placed by the application framework into the application. Additionally, metadata describing relationships between components and services from the perspective of the component architecture is also collected. Retrieved metadata describing a functional abstraction comprises the following information:

Definition of the functional abstraction.

A unique handle for referencing the functional abstraction. An example of such a handle is a unique name used when presented in development tools such as an IDE (Integrated Development Environment) such as WebLogic Workshop, WebSphere Studio, or Microsoft Visual Studio .Net. An example of such a name is a business process named RequestQuote represented by the functional abstraction of a workflow.

An application framework name binding the user code of the functional abstraction to the support code generated by the application framework and the service components of the application framework. For example, in order to instantiate RequestQuote, the runtime framework container accesses the user code and data definition, creates an instance of these and the necessary runtime framework objects, and associates these instances with the appropriate application framework services.

Functional abstraction operational parameters defining specific semantics of the behavioral of the functional abstraction. Examples of such parameters include whether the user code invocations are synchronous or asynchronous, buffered or non-buffered, stateful or stateless, transacted or non-transacted, or whether code invocations are migratable to another container or server in the event the current container or server fails. Many other such behavioral semantics are available and are highly dependent on the specific features of the application framework.

References to other functional abstractions. This metadata specifies a 'uses' relationship in the sense that the using functional abstraction (first abstraction) uses a supporting functional abstraction (second abstraction) in order to achieve a subset of the functionality of the first functional abstraction. Examples include the functional abstraction RequestQuote, implemented as a workflow, and invoking another functional abstraction named AvailabilityService implemented as a web service functional abstraction. RequestQuote uses AvailabilityService to fulfill a portion of the RequestQuote functionality. Such references can occur in the form of multi-layer hierarchies.

Public operations (service schemas) provided by the functional abstraction. A functional abstraction implements a set of functionality and makes this set available to clients and other functional abstractions. Public operations represent the functional contract the functional abstraction makes with clients and other functional abstractions. Functional abstraction operational parameters may affect the specific behavior of the public operations as they are executed. For example, a specific public operation may be buffered, i.e. placed temporarily into a queue in order to gracefully handle surges of requests for which the available processing bandwidth is temporarily insufficient. Public operations are given unique names which are typically scoped within a name space unique to the functional abstraction. Web services WSDL (Web Services Definition Language) files and WebLogic processes Java Process Definitions node methods are examples of such public operations. The display name of a public operation is collected if available.

The physical location(s) of the functional abstraction implementation (user code and framework generated code) is mapped within the application deployment in the context of the Application Server 202. This includes information detailing where the user code of the functional abstraction is placed in the application binary files as well as how such code is invoked. Additionally, these locations are mapped to specific components comprising the application from the perspective of the specific component architecture. For example, in BEA WebLogic 8.1 platform, based on the J2EE component architecture, the user code corresponding to RequestQuote (which is a functional abstraction implemented as a workflow called a "process" by BEA) is deployed within a Web Application Modules (J2EE terminology); however, at runtime, Enterprise Java Beans (entity, session, and message driven) of different types (which are application framework generated code) are used for invoking the user code in RequestQuote and for providing necessary runtime services to the functional abstraction. Such information is critical to the modeling process. Such components are then analyzed for dependencies on other components within the same application deployment as well as across application deployments. The final dependency graph of components is then analyzed to determine any dependencies on container services. Service and component models are generated from this information.

The object code names and/or entry points of the user code. These may be identical to the public operation names, or may be different such that a mapping is established between these and the public operation names. The objective is to achieve a mapping between the abstract public operations and the concrete physical user code which implements the operations for enabling (a) instrumentation and monitoring of public operation performance as well as (b) user code execution performance in the context of the processing required for a specific public operation.

Application deployment metadata comprises an inventory of the components in the application deployment. Component architecture metadata and object code analysis techniques are used to create a dependency graph of components and container services (as components use container services).

Figure 4:
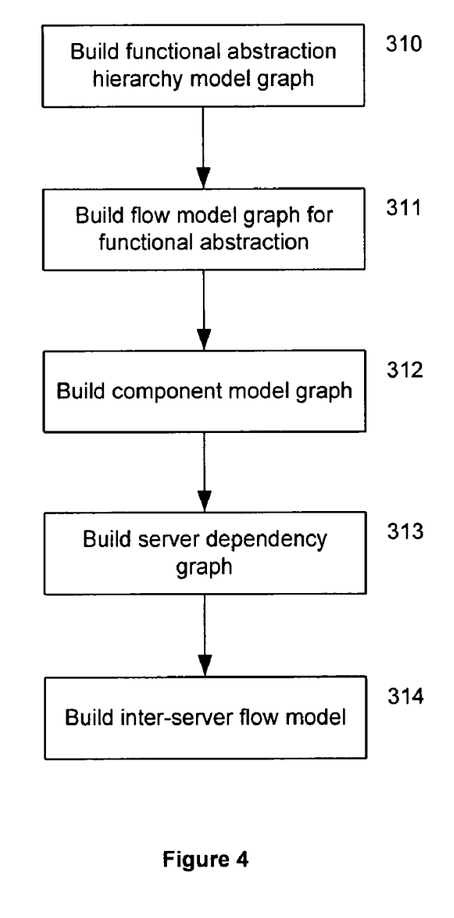
FIG. 4 is a flow diagram illustrating a method for building a performance model for monitoring and performance management of component-based applications, according to an embodiment of the present invention.

Step 302: Build model. The modeling construction process 302 uses the metadata described above and comprises the following steps, as shown in the flow diagram of FIG. 4:

Build 310 a functional abstraction hierarchy model graph. For each functional abstraction, determine its dependencies on other functional abstractions and create a representation of the dependencies, for example in the form of a directed dependency graph. The source of a directed edge represents the functional abstraction which depends on the functional abstraction represented by the edge destination. Dependencies are detected by finding functions in one functional abstraction which invoke the functionality of another functional abstraction. For a workflow, for example, a particular node in the flow may require the services of another functional abstraction. This dependency would be modeled as DependentFunctionalAbstraction.NodeX->SupportingFunctionalAbstraction. In the case where the supporting functional abstraction comprises more than one public operation, the destination will be further qualified with the name of the public operation, e.g. SupportingFunctionalAbstraction#PublicOperationA. Where the application framework allows functional abstractions to make indirect public operation requests to supporting functional abstractions via intermediate components and services, the modeling procedure searches along the invocation paths from the dependent functional abstractions and detects paths which invoke supporting functional abstractions. The resulting information causes edges to be added to the model graph such that transitivity of the dependency is represented as well. As a result, direct and indirect functional abstraction dependencies are modeled. Functional abstractions which do not support any other functional abstractions are placed at the top of the dependency hierarchy and are assumed to be the highest level and hence most abstract functional abstractions of the application.

Build 311 a flow model graph for functional abstraction. For each functional description, create a flow directed graph representing the sequence of execution steps of the functional abstraction. This sequence is a function of the definition of the function abstraction. For example, in the case of a workflow, the sequence of steps beginning at the start node and progressing to the end node, as well as any abortion or termination points, is modeled. The model comprises a directed graph with the source node of an edge representing the predecessor node and the destination node representing the successor node. Flow graphs provide a structure for tracking the activity of instances across the nodes of the functional abstraction. This structure allows performance metrics to be tracked at the node level or across sequences of nodes, which is more appropriate for top-down representations. Cycles in this graph may be eliminated for more convenient processing by deleting edges or grouping nodes according to node semantics, for example by contracting two or more nodes with similar semantics into a single abstract node, or by grouping a set of nodes having a related set of semantics into a single (aggregate) node.

Build 312 a component model graph. Determine the dependency graph for the applications deployed on Managed Servers 202. This is a directed graph with the source of each edge representing the component which depends on the component at the destination edge. Two approaches are used to compute these dependencies. The first comprises using any metadata which is part of the component architecture. Due to their component orientation, component architectures allow specification of component deployment and runtime component interaction, the specification conveyed using some form of metadata made available to the container at deployment time. As an example, for J2EE this metadata exists in deployment descriptors. Explicit declarations are made in deployment descriptors indicating supporting components and services used by dependent components. The second approach comprises object code analysis. As an example, for Java byte code in J2EE, a complete control flow graph (in the sense of compiler theory) is computed for the Java classes in the component. Entry points to the component are identified. For example, the entry points for an EJB (Enterprise Java Bean) are the methods of its remote interface. Exit points are computed and defined as calls to component or service interfaces existing outside the component. Exit points are classified by call type (i.e. to which type of component the call corresponds). An attempt is made to resolve the exit points to the specific supporting component. Any points unresolved during this process (static analysis) will be deferred to execution time where dynamic calls can be tracked (runtime analysis). This inability to resolve all exit points to specific components results in three types of edges in the component graph: Fully resolved edges for which, by definition of the interfaces and the metadata for the dependent and support components, the dependency can be deterministically computed during static analysis; partially resolved edges, where the supporting components are reduced to a subset of all supporting components of that type (e.g. all servlets with '/a/b' in the base of their URI (Unique Resource Indicator)), and non-determinable edges, where the destination references a node that represents a type of component or service. Additionally, component dependencies on container services are also determined. An edge is added with the source originating from the dependent component and the destination referencing a vertex representing the support service. For example, in J2EE a component such as an EJB may use a JDBC (Java Database Connectivity) connection pool or JMS (Java Message Service). In the case of JDBC, the reference will be to a named connection pool available within the J2EE container. In the case of JMS, the reference will correspond to a connection factory which enables the component to access the underlying messaging services supported by the JMS provider. Create edges mapping functional abstractions from the functional abstraction hierarchy model graph to their containing components in the component model. A containing component is a component (as defined in the sense of the specific component architecture in use) which contains the user and framework-generated code for each functional abstraction. A functional abstraction may have one or more containing components.

Build 313 a server dependency graph. Because different sets of applications and services may be deployed over different servers, a graph is created mapping functional abstractions and containing components to the servers which host them. In the case where there is no specific information available describing deployment of functional abstractions on specific servers, the component model (a) is first used to find the respective supporting components, and (b) the locations of the supporting components are used to determine inter-server dependencies.

Build 314 an inter-server flow model. Using server dependency graphs, build a flow model across servers, with functional abstractions serving as the abstraction level. Functional abstractions which do not support other servers are placed at the highest level, and servers hosting supporting functional abstractions are placed below (possibly resulting in a cyclic graph, similar to above). Continuing down the functional abstraction hierarchy to the containing components, add edges for supporting components which reside on different servers.

Step 303: Analyze model to determine what to instrument and monitor, and create a monitoring hierarchy.

For each functional abstraction, determine the metrics which need to be collected. For each public operation, metrics are collected for request arrivals, service time, and errors. For functional abstractions which have well-defined processing sequences (such as workflows with nodes which carry out specific steps), metrics are collected for the steps in the sequence. If steps can be executed asynchronously, events are used to indicate the starting and completion of a step. In general, metrics are preferred to events since they can be represented with counters which may then be sampled periodically. Events may incur significant overhead since their volume is proportional to the amount of functional abstraction execution.

For example, public operations for functional abstractions are assigned a collection value of 0 (lowest indicating highest importance), metrics for interval processing sequences are assigned a value of 1, and invocations of other functional abstractions by internal processing sequences are assigned a value of 2. The hierarchy of functional abstractions is processed breadth first from the topmost functional abstractions to the leaves of the hierarchy. As an illustrative example, the levels of the hierarchy are assigned the values 0, 10, 20, . . . . This allows the values for the metrics at each level to be added to the next level in order to establish their overall ranking across the possible metrics. For each leaf of each functional abstraction encountered, a check is made to determine if the leaf maps to a component in the component model. If yes, this implies that the leaf node depends on the referenced component. The metrics for the component are then assigned a rank base of 10 greater than the highest value assigned to the lowest level functional abstraction, thereby ranking component metrics lower than functional abstractions metrics. For each such component, continue traversal of the component dependency graph, adding 10 to each subsequent component level. In the event where metrics are encountered more than once in such traversals, their respective highest ranking values are kept, causing metrics for multi-use components to receive the highest ranking. The value 1 is also subtracted from the resulting value, causing multi-purpose metrics to rank higher than single purpose metrics. For all components not touched by the above traversals, start traversing from the top down beginning with component which support no other components and perform a similar component traversal as described above. Assign ranking values for these top level components such that they are weighted lower than all preceding metrics. Components are ranked according to the rankings of their respective functional abstractions. Optionally, if the quota partially covers a set of nodes having equal values, a tie-breaker rule is employed to impose a total ordering across the set of nodes.

Obtain a predefined quota value which limits the number of metrics which the Performance Manager is willing to collect at a periodic sampling rate, e.g. 1000. Sort the metrics from above descending rank order. Fill the quota with the first 1000 highest ranked metrics. Event collection may be used in place of a set of collected metrics, for example in a situation where the cost of maintaining the set of collected metrics is high compared to collecting the same information using an event collection approach.

Step 304: Instrument and collect information. Using the OA&M API or a set of one or more agents, the Performance Manager 205 collects the determined metrics at periodic intervals.

Optionally, and in the case where metrics representing code method invocation count and delay are required, a mechanism for pre-instrumenting such code is desired in order to obviate the need of having to restart, reinitialize or reload the code prior to metric and/or event collection or modification of the set of metrics and/or events. An operational challenge of instrumenting code results from the necessity to decide whether to instrument or not when the code is loaded into memory for execution. This is mainly because once code is loaded it typically cannot be altered. However, it is desirable to be able to instrument code with the assumption that the instrumentation will prove useful in the future, for example when a performance problem arises. Such a capability allows instrumentation to be leveraged for troubleshooting and disabled during normal operating conditions. This allows the instrumentation to reside in memory and its execution to be controlled using conditional tests which determine if the metrics are updated or not. One approach would be to instrument all code. This is generally not practical due to the potential resources consumed even if the instrumented code can be enabled and disable conditionally. The other extreme comprises specifying a priori the code to be instrumented. The problem is that deployment of new applications (and hence new code) must be deferred until the decision of what should be instrumented is available, since the names of the application specific classes must be known. A hybrid approach is taken herein, leveraging the fact that much code which tends to be instrumented is part of class derivation hierarchies. As a result it is possible to indicate that subclasses of a derivation hierarchy be specified in a particular manner, where the decision process of determining whether a particular concrete class is a subclass of a particular derivation hierarchy should be instrumented or not. For example, in a component framework such as J2EE in which components are coded in Java byte code, and the Java byte code comprises sufficient information for determining the derivation hierarchy of an arbitrary Java class, it is possible to determine if an arbitrary class should be instrumented at time the class is first referenced and loaded into memory. When the application modeling mechanism can pre-specify the kinds of classes to be instrumented, the net effect is an instrumentation-on-demand capability. In one embodiment, specify javax.ejb.EntityBean to an instrumentation agent in order to instrument calls to J2EE Entity Beans. Similarly, artifacts which represent functional abstractions can also be instrumented. For example, com.beajpd.ProcessDefinition causes the instrumentation agent to instrument all WebLogic Process (workflow) implementation classes.

Due to the same challenges stated above, it is desirable to be able to instrument calls made by methods in a class (for example one of the instrumented classes above) to methods external to the class, and defer the decision as to which calls to actually measure until a later time. Our approach is scan the code of each class method from beginning to end, assigning an integer ID to each call. The modeling process of the Performance Manger may then analyze the same byte code and compute the same indices. It may then specify to the instrumentation agents the calls for which it desires metrics. For example:

```
Class foo {
Void MethodA( ) {
ObjectX.methodX( )//index 0
ObjectY.methodY( )//index 1
}
``` would enable calls to ObjectX.methodX and ObjectY.methodY from inside foo to be instrumented in advance.

Logically grouping classes which constitute an application is very useful in a virtual machine environment where classes from different applications share the same flat memory space. Because applications perform different functions, the same class, if used in two or more applications, may behave differently from a performance analysis perspective. For example, if the same class is used in two different applications, with the first application having very long delays and the second application having no long delays, then aggregating the class metrics into the same statistic can substantially skew the statistic. J2EE requires that classes for different applications are loaded into different name spaces (called class loaders in Java terminology). This mechanism can be leveraged to associate the class byte code instance (not instance data) with the application in which it is contained. Since a unique set of instrumentation is generated for each such class, the metrics are thus separated by application. More importantly, this provides a way to map actual class byte code to applications and their components (since class loaders' hierarchies reflect the component hierarchies of J2EE applications).

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for monitoring application performance, comprising:

a software program receiving a set of metadata, from a server in a server cluster, about an application deployed in said server cluster, wherein the set of metadata describes a set of functional abstractions of the application and a set of components of the application, wherein each member of said set of functional abstractions describes an anticipated execution sequence of application logic for the application, wherein each member of said set of components describes a set of executable code providing a coherent set of one or more functions, wherein the software program is executing on a first hardware component, wherein the server is executing on a second hardware component, and wherein the first hardware component is not the second hardware component;

the software program generating a performance model according to said set of metadata, wherein said performance model models relationships between members of said set of functional abstractions and members of said set of components;

the software program determining, using said performance model, a set of performance metrics for use in monitoring and managing performance of said application; and the software program receiving a set of performance metric values for said set of performance metrics.

2. The method of claim 1, wherein the performance model comprises (a) a set of abstract nodes, (b) a set of concrete nodes, and (c) a mapping from the set of abstract nodes to the set of concrete nodes, wherein the set of abstract nodes represents the set of functional abstractions, and wherein the set of concrete nodes represents the set of components.

3. The method of claim 1, wherein the performance model comprises (a) a set of abstract nodes, (b) a set of concrete nodes, and (c) a mapping from the set of abstract nodes to the set of concrete nodes, wherein the set of abstract nodes represents the set of functional abstractions, wherein the set of concrete nodes represents the set of components, and wherein the software program determining comprises the software program ranking the set of abstract nodes and the set of concrete nodes in a top-down fashion according to a node hierarchy indicated by the mapping.

4. The method of claim 1, wherein said software program determining, using said performance model, the set of performance metrics comprises:
   at a first point in time, configuring each of a set of classes to be capable of providing performance metric values; and
   at a later point in time, instructing a proper subset of said set of classes to provide said performance metric values, wherein said later point in time is after said first point in time, and wherein said proper subset includes at least one class.

5. The method of claim 1, further comprising:
   aggregating a group of performance metric values in said set of performance metric values, wherein said group of performance metric values are aggregated across two or more functional abstraction instances.

6. The method of claim 1, wherein a first component of said set of components is deployed on a first server of said server cluster, and wherein a second component of said set of components is deployed on a different server of said server cluster than said first server.

7. The method of claim 1, further comprising:
   collecting information about events that have occurred in said server cluster, wherein said events relate to said application, and wherein said information is used in generating said performance model.

8. The method of claim 1, wherein said performance model identifies, for each functional abstraction of said set of functional abstractions, any dependencies a particular functional abstraction has on all other functional abstractions of said set of functional abstractions.

9. The method of claim 1, wherein said performance model identifies which server, in said server cluster, is hosting each of said functional abstractions of said set of functional abstractions, and wherein said performance model identifies upon which server each of said set of components is deployed.

10. The method of claim 1, wherein said software program determining, using said performance model, said set of performance metrics comprises:
    for each functional abstraction in said set of functional abstractions, determining a particular set of performance metrics for use in monitoring and managing performance of said application, wherein the particular set of performance metrics associated with each functional abstraction, of said set of functional abstractions, is different.

11. A machine-readable storage medium storing one or more sequences of instructions, which when executed, cause:
    a software program receiving, from a server in a server cluster, a set of metadata about an application deployed in said server cluster, wherein the set of metadata describes a set of functional abstractions of the application and a set of components of the application, wherein each member of said set of functional abstractions describes an anticipated execution sequence of application logic for the application, and wherein each member of said set of components describes a set of executable code providing a coherent set of one or more functions;
    the software program generating a performance model according to said set of metadata, wherein said performance model models relationships between members of said set of functional abstractions and members of said set of components;
    the software program determining, using said performance model, a set of performance metrics for use in monitoring and managing performance of said application; and
    the software program receiving a set of performance metric values for said set of performance metrics.

12. The machine-readable storage medium of claim 11, wherein the performance model comprises (a) a set of abstract nodes, (b) a set of concrete nodes, and (c) a mapping from the set of abstract nodes to the set of concrete nodes, wherein the set of abstract nodes represents the set of functional abstractions, and wherein the set of concrete nodes represents the set of components.

13. The machine-readable storage medium of claim 11, wherein the performance model comprises (a) a set of abstract nodes, (b) a set of concrete nodes, and (c) a mapping from the set of abstract nodes to the set of concrete nodes, wherein the set of abstract nodes represents the set of functional abstractions, wherein the set of concrete nodes represents the set of components, and wherein the software program determining comprises ranking the set of abstract nodes and the set of concrete nodes in a top-down fashion according to a node hierarchy indicated by the mapping.

14. The machine-readable storage medium of claim 11, wherein said software program determining, using said performance model, the set of performance metrics comprises:
    at a first point in time, configuring each of a set of classes to be capable of providing performance metric values; and
    at a later point in time, instructing a proper subset of said set of classes to provide said performance metric values, wherein said later point in time is after said first point in time, and wherein said proper subset includes at least one class.

15. The machine-readable storage medium of claim 11, wherein execution of said one or more sequences of instructions further comprises:
    aggregating a group of performance metric values in said set of performance metric values, wherein said group of performance metric values are aggregated across two or more functional abstraction instances.

16. The machine-readable storage medium of claim 11, wherein a first component of said set of components is deployed on a first server of said server cluster, and wherein a second component of said set of components is deployed on a different server of said server cluster than said first server.

17. The machine-readable storage medium of claim 11, wherein execution of said one or more sequences of instructions further comprises:
    collecting information about events that have occurred in said server cluster, wherein said events relate to said application, and wherein said information is used in generating said performance model.

18. The machine-readable storage medium of claim 11, wherein said performance model identifies, for each functional abstraction of said set of functional abstractions, any dependencies a particular functional abstraction has on all other functional abstractions of said set of functional abstractions.

19. The machine-readable storage medium of claim 11, wherein said performance model identifies which server, in said server cluster, is hosting each of said functional abstractions of said set of functional abstractions, and wherein said performance model identifies upon which server each of said set of components is deployed.

20. The machine-readable storage medium of claim 11, wherein said software program determining, using said performance model, said set of performance metrics comprises:
   for each functional abstraction in said set of functional abstractions, determining a particular set of performance metrics for use in monitoring and managing performance of said application, wherein the particular set of performance metrics associated with each functional abstraction, of said set of functional abstractions, is different.

21. An apparatus for monitoring application performance, comprising:
   a machine-readable medium storing one or more sequences of instructions, which when executed, cause:
   a software program receiving a set of metadata, from a server in a server cluster, about an application deployed in said server cluster, wherein the set of metadata describes a set of functional abstractions of the application and a set of components of the application, wherein each member of said set of functional abstractions describes an anticipated execution sequence of application logic for the application, wherein each member of said set of components describes a set of executable code providing a coherent set of one or more functions, and wherein the software program executes on the apparatus,
   the software program generating a performance model according to said set of metadata, wherein said performance model models relationships between members of said set of functional abstractions and members of said set of components,
   the software program determining, using said performance model, a set of performance metrics for use in monitoring and managing performance of said application, and
   the software program receiving a set of performance metric values for said set of performance metrics.

* * * * *